United States Patent
Shaheen et al.

(10) Patent No.: US 8,891,423 B2
(45) Date of Patent: Nov. 18, 2014

(54) GROUP-BASED MACHINE TO MACHINE COMMUNICATION

(75) Inventors: Kamel M. Shaheen, King of Prussia, PA (US); Debashish Purkayastha, Collegeville, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 841 days.

(21) Appl. No.: 12/975,711

(22) Filed: Dec. 22, 2010

(65) Prior Publication Data

US 2012/0004003 A1 Jan. 5, 2012

Related U.S. Application Data

(60) Provisional application No. 61/291,019, filed on Dec. 30, 2009, provisional application No. 61/289,274, filed on Dec. 22, 2009.

(51) Int. Cl.
| | |
|---|---|
| H04W 76/00 | (2009.01) |
| H04W 4/00 | (2009.01) |
| H04W 4/08 | (2009.01) |
| H04W 60/00 | (2009.01) |
| H04W 8/18 | (2009.01) |
| H04W 8/26 | (2009.01) |
| H04W 8/06 | (2009.01) |

(52) U.S. Cl.
CPC ............. *H04W 60/00* (2013.01); *H04W 4/005* (2013.01); *H04W 8/26* (2013.01); *H04W 8/06* (2013.01); *H04W 4/08* (2013.01); *H04W 8/186* (2013.01)
USPC .... 370/311; 370/312; 370/395.2; 370/395.52

(58) Field of Classification Search
None
See application file for complete search history.

(56) References Cited

U.S. PATENT DOCUMENTS

| 7,072,340 | B2* | 7/2006 | Agrawal et al. | 370/392 |
| 8,072,948 | B2* | 12/2011 | Shaheen | 370/338 |
| 8,219,121 | B2* | 7/2012 | Sim et al. | 455/458 |
| 2005/0060551 | A1* | 3/2005 | Barchi et al. | 713/182 |
| 2006/0140149 | A1* | 6/2006 | Kim et al. | 370/331 |
| 2008/0081645 | A1* | 4/2008 | Kim et al. | 455/458 |

(Continued)

FOREIGN PATENT DOCUMENTS

JP 2008-294821 A 4/2008

OTHER PUBLICATIONS

3rd Generation Partnership Project (3GPP), TR 23.888, V0.1.1, "3rd Generation Partnership Project; Technical Specification Group Services and System Aspects; System Improvements for Machine-Type Communications (Release 10)", Dec. 2009, 12 pages.

(Continued)

*Primary Examiner* — Alex Skripnikov
(74) *Attorney, Agent, or Firm* — Condo Roccia Koptiw LLP

(57) ABSTRACT

Methods and apparatus are provided for performing group-based machine-to-machine communication. Machine-type communication (MTC) wireless transmit/receive units (WTRUs) may operate in MTC groups. MTC WTRUs belonging to the same MTC group may use a group-based International Mobile Subscriber Identity (IMSI) and a group-based IP address for data transmission. Group-based network registration may be performed. A group-based IP address and radio resources may be proactively allocated for an MTC group. A master MTC may perform network registration/attachment process on behalf of the MTC group. A group of MTC WTRUs may transmit data according to staggered time windows.

32 Claims, 14 Drawing Sheets

(56) References Cited

U.S. PATENT DOCUMENTS

| | | | |
|---|---|---|---|
| 2008/0291872 A1* | 11/2008 | Henriksson | 370/329 |
| 2011/0161503 A1* | 6/2011 | Krebs | 709/227 |
| 2012/0196570 A1* | 8/2012 | Lindholm et al. | 455/411 |
| 2012/0213185 A1* | 8/2012 | Frid | 370/329 |

OTHER PUBLICATIONS

3$^{rd}$ Generation Partnership Project (3GPP), S1-100140, "Group Based RAB & IP Assignment for TS 22.368", InterDigital Communication Corporation, 3GPP TSG SA WG1, #49, San Francisco, CA, Feb. 22-26, 2010, 2 pages.

3$^{rd}$ Generation Partnership Project (3GPP), S2-097483, "Network Improvements for Low Date Usage", Huawei, 3GPP TSG SA WG2, Meeting #76, San Jose Del Cabo, Mexico, Nov. 16-20, 2009, 2 pages.

3$^{rd}$ Generation Partnership Project (3GPP), S2-101007, "Device Based Optimization Solution for Smart Meeting Support in 3GPP System", InterDigital Communication Corporation, 3GPP TSG SA WG2, Meeting #78, San Francisco, CA, Feb. 22-26, 2010, 4 pages.

3$^{rd}$ Generation Partnership Project (3GPP), TR 22.868, V8.0.0, "3d Generation Partnership Project; Technical Group Services and System Aspects; Study on Facilitating Machine to Machine Communication in 3GPP Systems; (Release 8)", Mar. 2007, 15 pages.

3$^{rd}$ Generation Partnership Project (3GPP), TS 22.368, V1.1.1, "3$^{rd}$ Generation Partnership Project; Technical Specification Group Services and System Aspects; Service Requirements for Machine-Type Communications; Stage 1 (Release 10)", Nov. 2009, 23 pages.

Lin et al., "A Push Mechanism for GPRS Supporting Private IP Addresses", IEEE Communications Letters, Jan. 2003, 7(1), 24-26.

3rd Generation Partnership Project (3GPP), TD S2-101008, "Network Based Optimization Solution for Smart Metering Support in 3GPP System", 3GPP TSG SA WG2 Meeting #78, InterDigital Communication Corporation, NIMTC / Rel-10, Feb. 22-26, 2010, 5 pages.

* cited by examiner

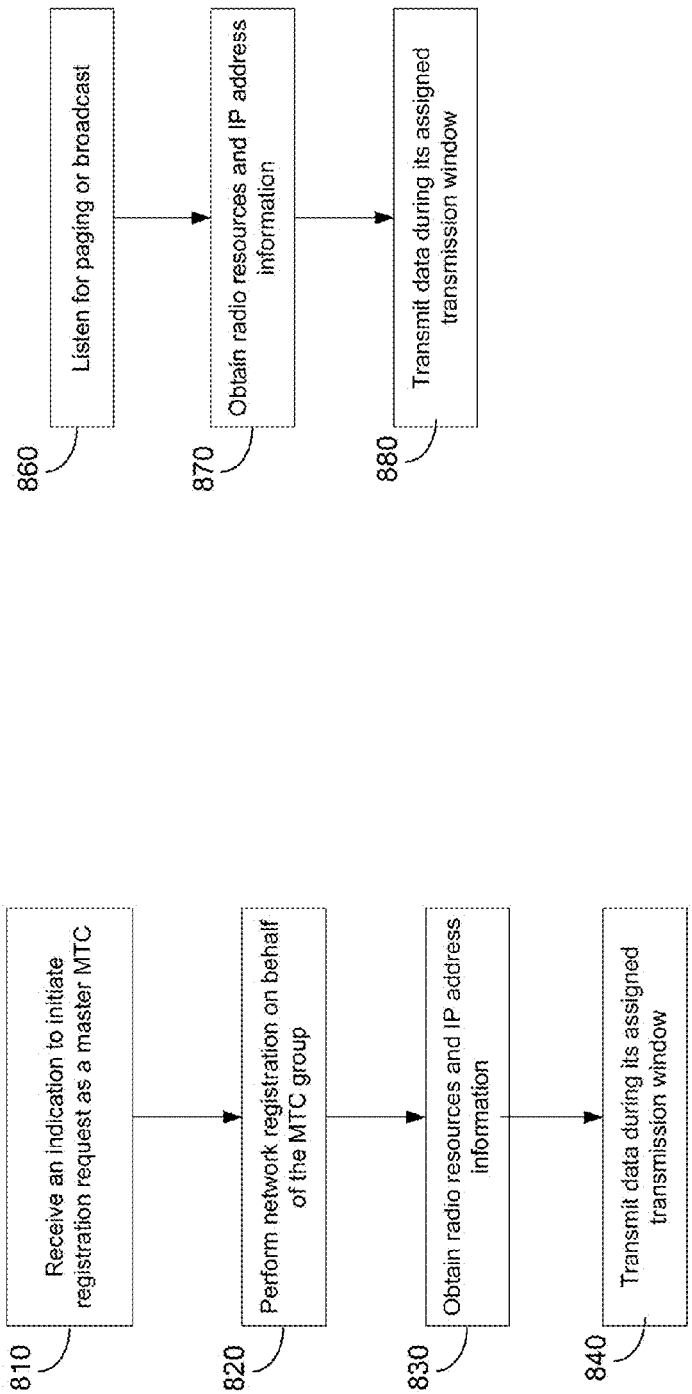

GROUP-BASED MACHINE TO MACHINE COMMUNICATION

CROSS-REFERENCE TO RELATED APPLICATIONS

This application claims the benefit of U.S. Provisional Application No. 61/289,274 filed on Dec. 22, 2009, and U.S. Provisional Application No. 61/291,019 filed on Dec. 30, 2009, each of which is incorporated herein by reference as if fully set forth.

BACKGROUND

Machine to Machine (M2M) communication (also referred to as "machine-type communications" or "MTC") may be seen as a form of data communication between entities that do not necessarily need human interaction.

M2M communication may be used in a variety of areas. In the area of security, M2M communication may be used in surveillance systems, in backup of telephone landlines, in the control of physical accesses (e.g. to buildings), and in car/driver security. In the area of tracking and tracing, M2M communication may be used for fleet management, order management, Pay As You Drive (PAYD) applications, asset tracking, navigation, traffic information applications, road tolling, traffic optimization, and steering. In the area of payment systems, M2M communication may be used in point of sales, vending machines, customer loyalty applications, and gaming machines. In healthcare, M2M communication may be used for remotely monitoring vital signs, supporting the elderly or handicapped, in web access telemedicine points, and in remote diagnostics. In the area of remote maintenance/control, M2M communication may be used in programmable logic controllers (PLCs), sensors, lighting, pumps, valves, elevator control, vending machine control, and vehicle diagnostics. In the area of metering, M2M communication may be used in applications related to power, gas, water, heating, grid control, and industrial metering. Additionally, M2M communication based on machine type communication (MTC) technology may be used in areas such as customer service.

M2M communications may take advantage of deployed wireless networks based on Third Generation Partnership Project (3GPP) technologies such as Global System for Mobile Communications (GSM), Universal Mobile Telecommunications System (UMTS), Long Term Evolution (LTE), and/or other technologies such as those developed by the Institute for Institute of Electrical and Electronics Engineers (IEEE) and 3GPP2. M2M communications may use networks based on these technologies to deliver business solutions in a cost-effective manner. In a circumstance involving ubiquitous deployment of wireless networks, the availability of the wireless networks may facilitate and/or encourage the deployment and use of MTC devices. Additionally, further enhancements to these technologies may provide additional opportunities for the deployment of M2M-based solutions.

Current M2M-based solutions do not adequately address potential congestions on the network that may be caused by a large number of MTC devices performing network registration and/or transmitting data simultaneously. Accordingly, new technology that overcomes this shortcoming in the current technology is needed.

SUMMARY

Disclosed herein are method embodiments and apparatus embodiments for performing group-based machine-to-machine communication. In an embodiment, machine-type communication wireless transmit/receive units (MTC WTRUs) may be organized into groups. MTC WTRUs belonging to the same MTC group may use a group-based International Mobile Subscriber Identity (IMSI). Group-based network registration may be performed. A group of MTC WTRUs may transmit data according to staggered time windows.

In an embodiment, the IP address and radio resources may be proactively allocated for the MTC group. For example, the core network (CN) may perform group pre-registration upon a service request from an MTC application server (AS). The service request may be triggered periodically, or may be triggered based on an event. For example, upon receiving the service request, the CN may activate an IP address and may allocate radio resources for the MTC group. In an embodiment, the IP address and radio resources may be proactively allocated for the MTC group without receiving an explicit request from the MTC group. The MTC WTRUs may receive a page or broadcast with information related to the allocated IP address and radio resources to the MTC group with a group identifier associated with the MTC group. The MTC WTRUs may obtain the allocated IP address and radio resources based on the page or broadcast, and use the IP address and radio resources to transmit data.

The MTC WTRUs may transmit data in a sequential order. For example, each MTC WTRU may transmit data in a prescribed transmission window. The sequential order may be controlled by the CN. The CN may page individual MTC WTRUs in the MTC. The paged MTC WTRUs may upload data on Common Traffic Channel (CTCH) and/or random access channel (RACH).

In an embodiment, an MTC group may include a master MTC and one or more slave MTCs. The master MTC may perform network registration/attachment process on behalf of the MTC group. For example, the master MTC may send a network attach request with information that may identify the MTC WTRUs in the MTC group such that the CN may send an attachment acceptance message to the MTC WTRUs in the MTC group. Upon accepting the attachment request, the CN may broadcast or page with radio resources and/or IP address information. In an embodiment, the MTC WTRUs may receive an indication to retrieve radio resources and/or IP address information via a dedicated channel.

BRIEF DESCRIPTION OF THE DRAWINGS

A more detailed understanding may be had from the following description, given by way of example in conjunction with the accompanying drawings.

FIG. 8A illustrates a flow diagram of performing M2M communications for a master MTC.

FIG. 8B shows an example process for group-based M2M communication for a slave MTC.

DETAILED DESCRIPTION OF ILLUSTRATIVE EMBODIMENTS

Disclosed herein are method embodiments and apparatus embodiments for performing group-based machine-to-machine communication. In an embodiment, machine-type communication (MTC) wireless transmit/receive units (WTRUs) may be organized into groups. MTC WTRUs belonging to the same MTC group may use a group-based International Mobile Subscriber Identity (IMSI). Group-based network registration may be performed.

Figure 1A:
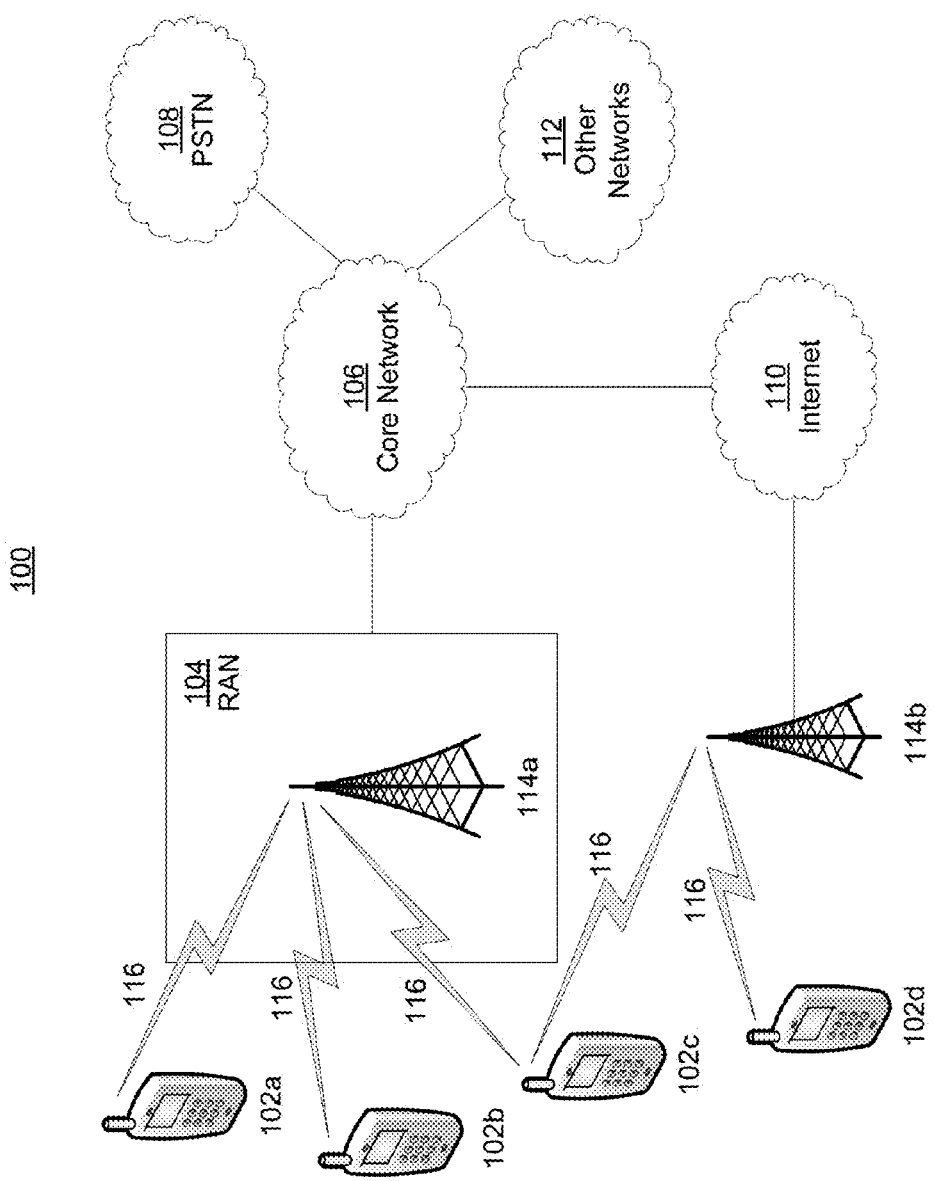
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The core network 106 may include at least one transceiver and at least one processor. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
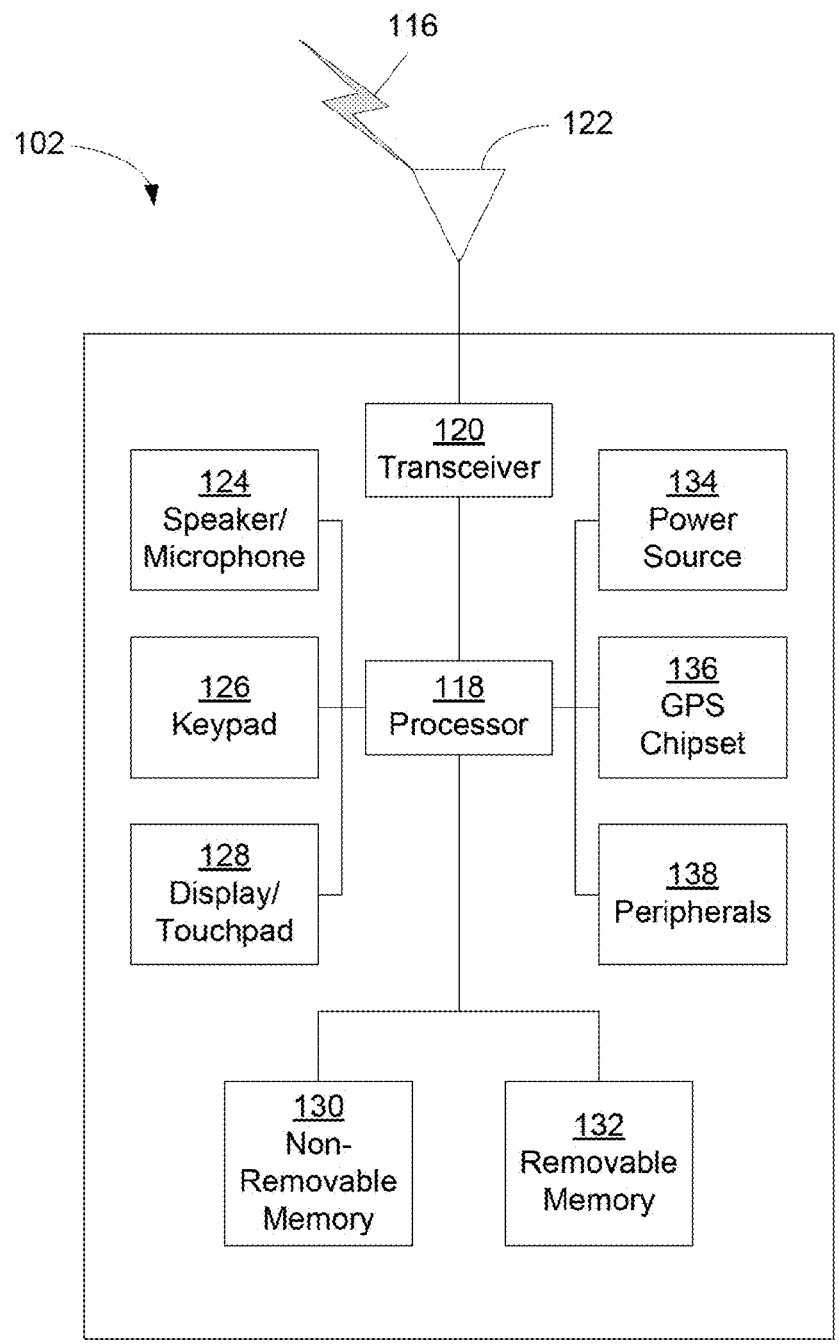
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
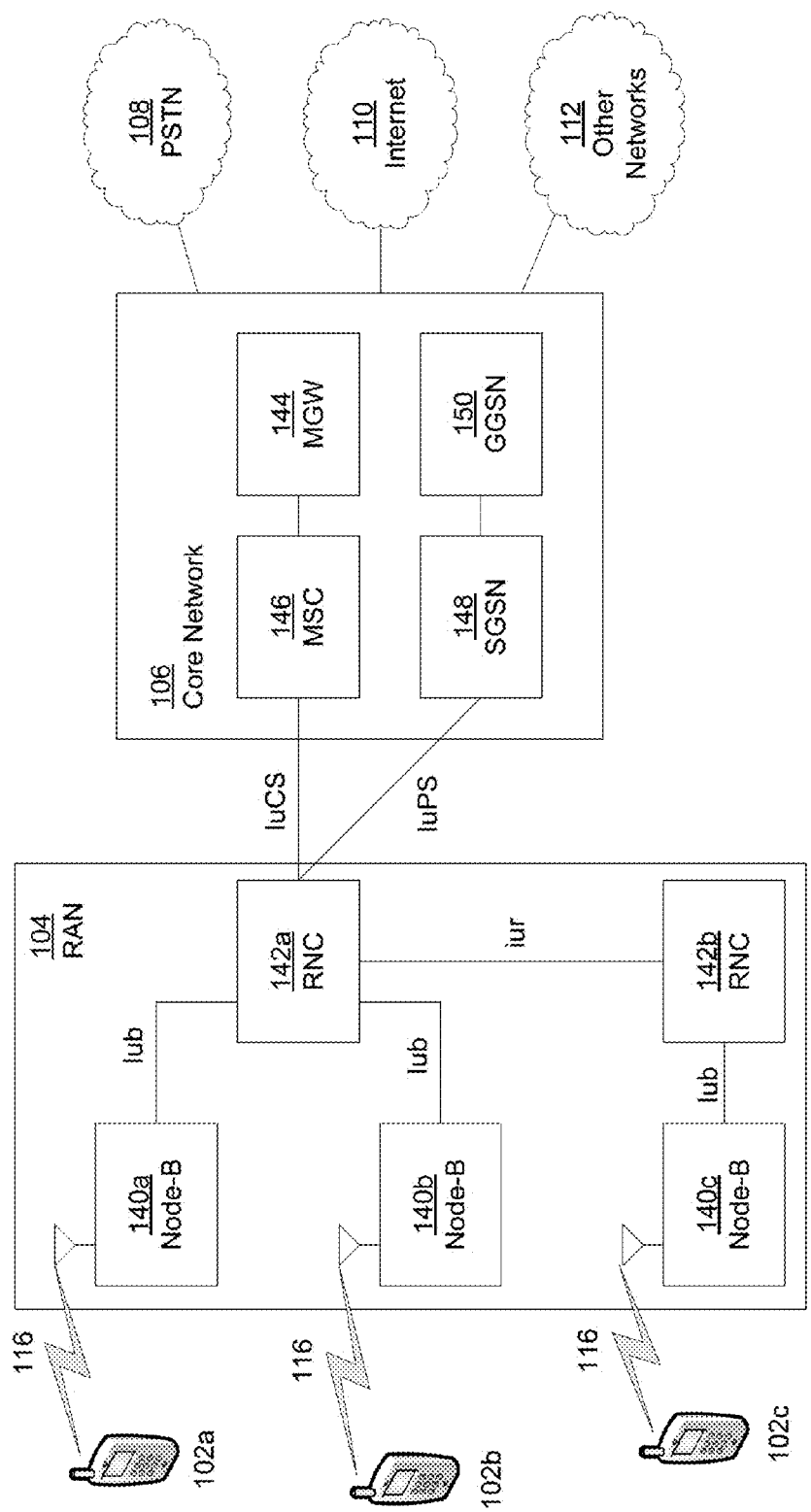
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b and 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
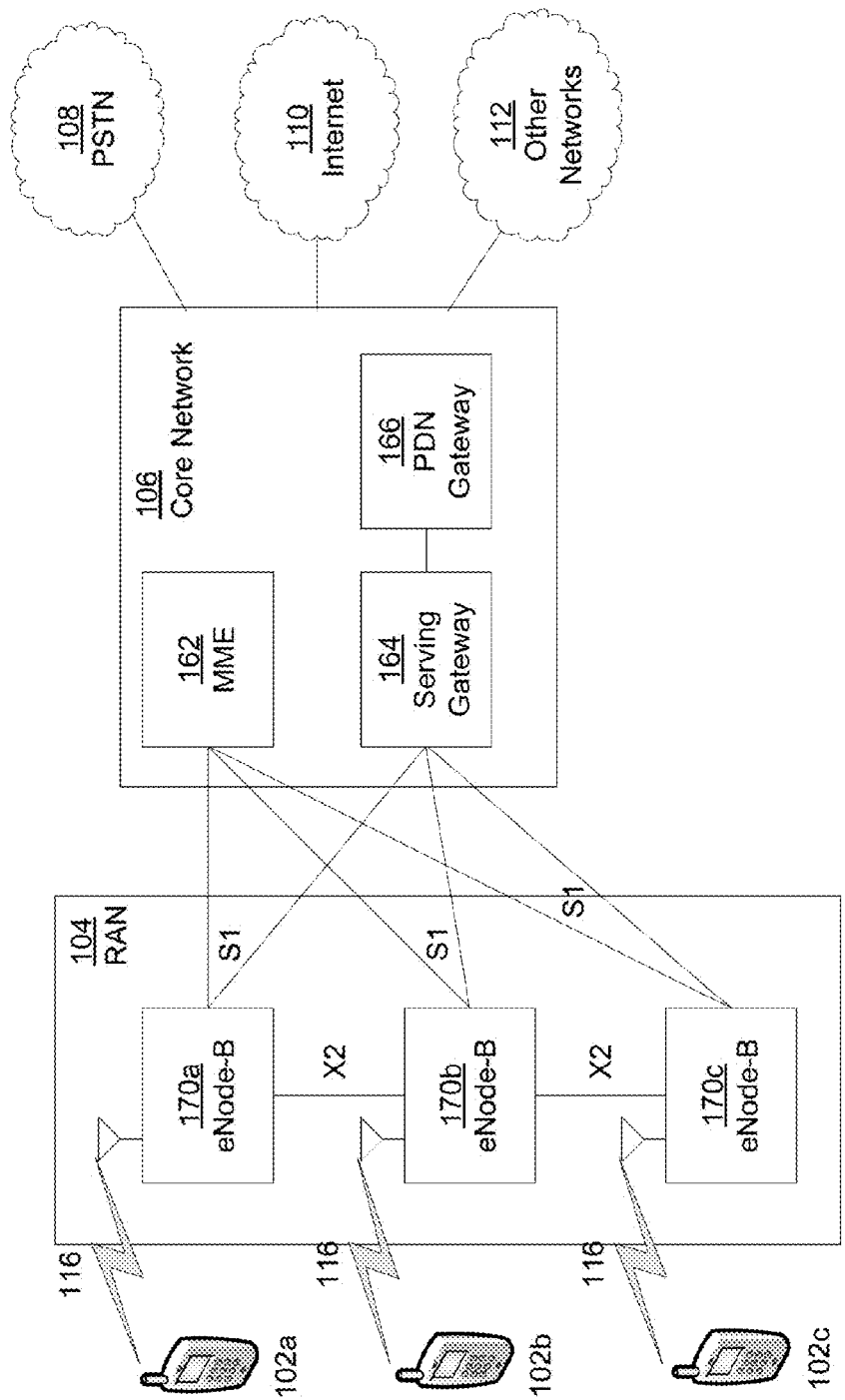
FIG. 1D is a system diagram of an example radio access network and an example core network that may be used within the communications system illustrated in FIG. 1A.

FIG. 1D is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 170a, 170b, 170c, though it will be appreciated that the RAN 104 may include any number of eNode-Bs while remaining consistent with an embodiment. The eNode-Bs 170a, 170b, 170c may each include one or more transceivers for communicating with the WTRUs 102a, 102b, 102c over the air interface 116. In an embodiment, the eNode-Bs 170a, 170b, 170c may implement MIMO technology. Thus, the eNode-B 140a, for example, may use multiple antennas to transmit wireless signals to, and receive wireless signals from, the WTRU 102a.

Each of the eNode-Bs 170a, 170b, 170c may be associated with a particular cell (not shown) and may be configured to handle radio resource management decisions, handover decisions, scheduling of users in the uplink and/or downlink, and the like. As shown in FIG. 1D, the eNode-Bs 170a, 170b, 170c may communicate with one another over an X2 interface.

The core network (CN) 106 shown in FIG. 1D may include a mobility management gateway (MME) 162, a serving gateway 164, and a packet data network (PDN) gateway 166. While each of the foregoing elements are depicted as part of the core network 106, it will be appreciated that any one of these elements may be owned and/or operated by an entity other than the core network operator.

The MME 162 may be connected to each of the eNode-Bs 170a, 170b, 170c in the RAN 104 via an Si interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 170a, 170b, 170c in the RAN 104 via the Si interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
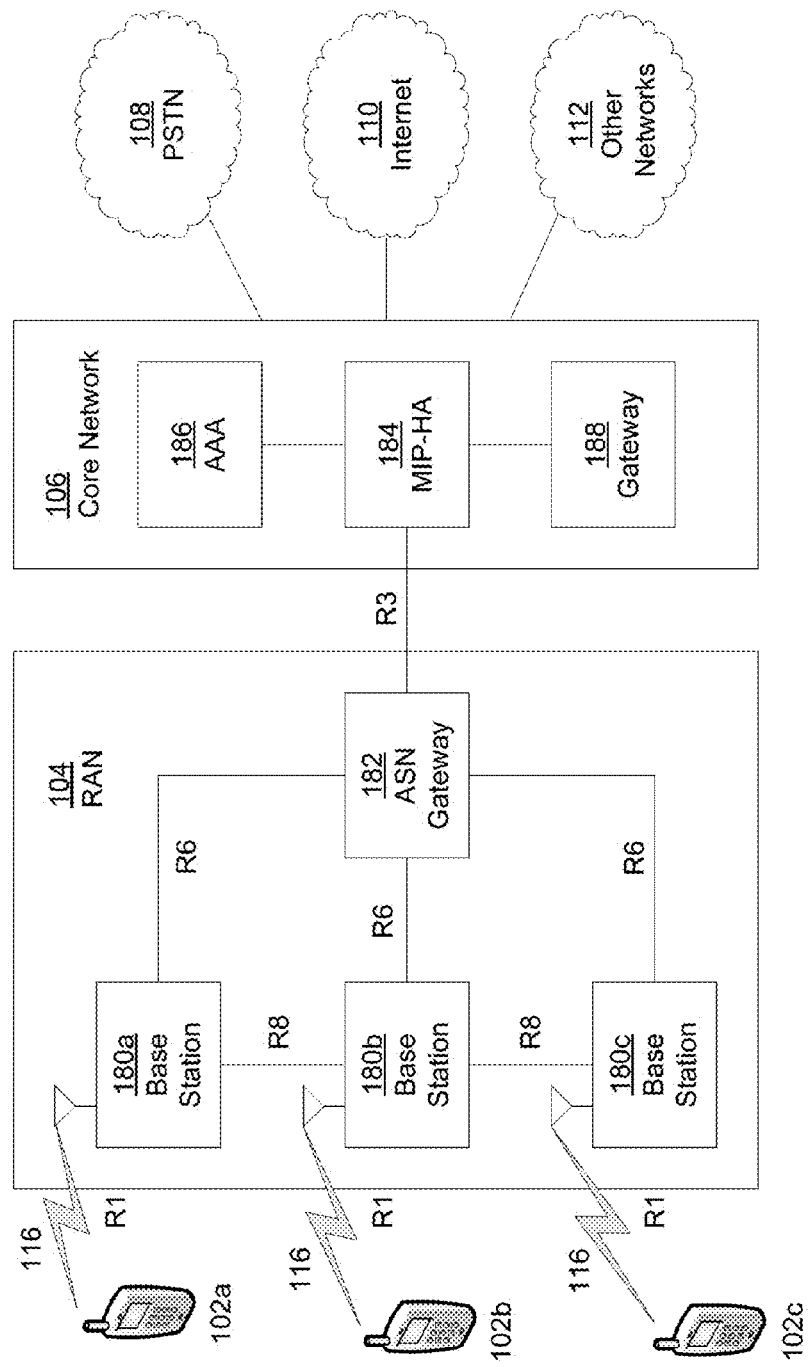
FIG. 1E is a system diagram of an example radio access network and an example core network that may be used within the communications system illustrated in FIG. 1A.

FIG. 1E is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 180a, 180b, 180c, and an ASN gateway 142, though it will be appreciated that the RAN 104 may include any number of base stations and ASN gateways while remaining consistent with an embodiment. The base stations 180a, 180b, 180c may each be associated with a particular cell (not shown) in the RAN 104 and may each include one or more transceivers for communicating with the WTRUs 102a, 102b, 102c over the air interface 116. In one embodiment, the base stations 180a, 180b, 180c may implement MIMO technology. Thus, the base station 140a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management. The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 215 may be defined as an R6 reference point. The R6 reference point may include protocols for facilitating mobility management based on mobility events associated with each of the WTRUs 102a, 102b, 100c.

As shown in FIG. 1E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 184, an authentication, authorization, accounting (AAA) server 186, and a gateway 188. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

A "MTC WTRU" or a "M2M WTRU" may include a WTRU capable of communicating using MTC/M2M technology. For example, the MTC WTRU and/or M2M WTRU, may include a WTRU, such as the one described in connection with FIGS. 1A-E, capable of communicating using MTC/M2M technology. For example, an MTC WTRU may include an MTC device.

Figure 2:
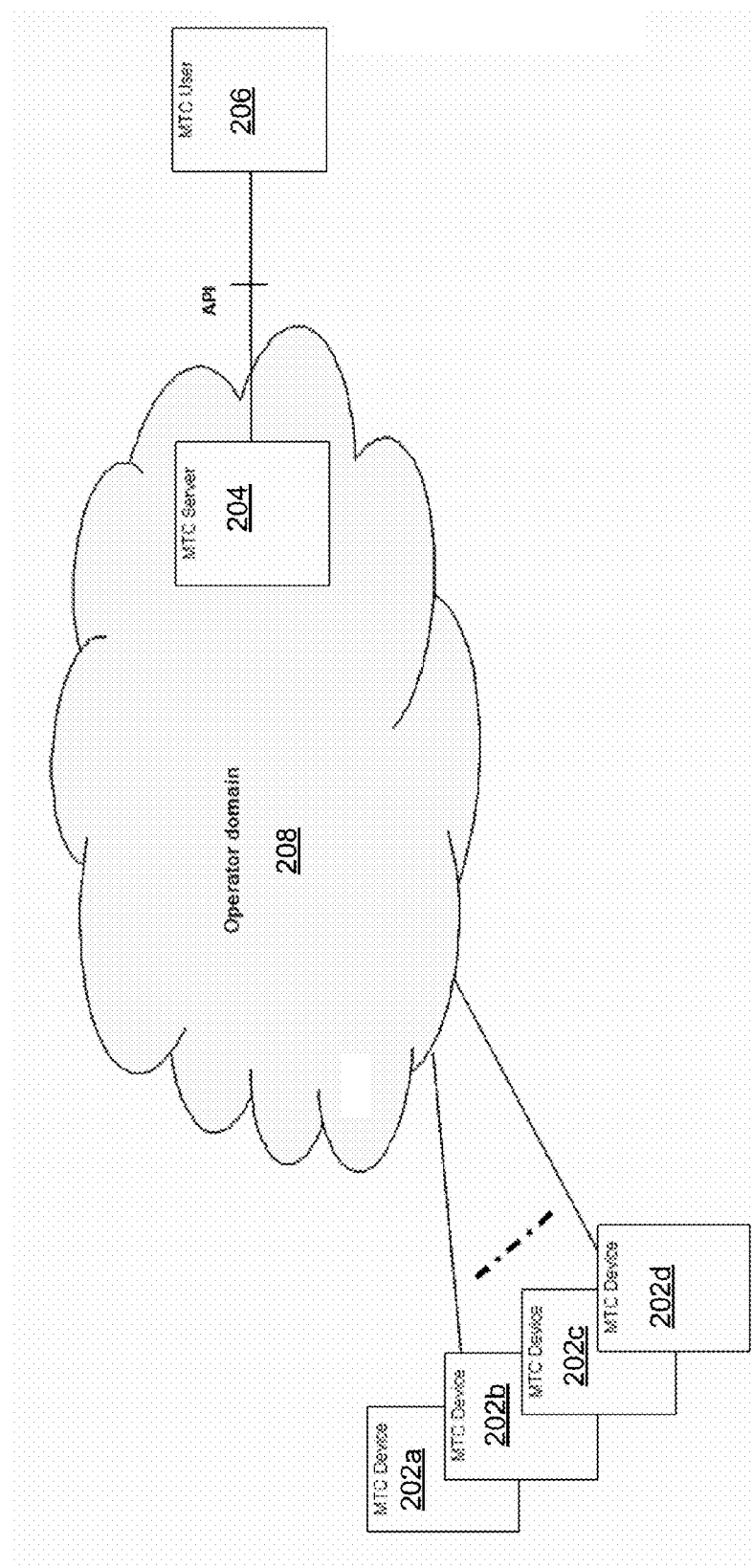
FIG. 2 shows example architecture for MTC communication that includes an MTC server inside an operator domain.

FIG. 2 illustrates example architecture for use in MTC communication. As shown, one or more MTC devices such as MTC devices 202a, 202b, 202c and 202d may communicate to one or more MTC servers such as MTC server 204 via an operator domain such as operator domain 208. As shown in FIG. 2, The MTC server 204 may be located in the operator domain 208, for example. MTC users such as MTC user 206 may access the MTC server 204, for example, via an application protocol interface (API) such that the MTC user may communicate with MTC devices 202a, 202b, 202c.

Figure 3:
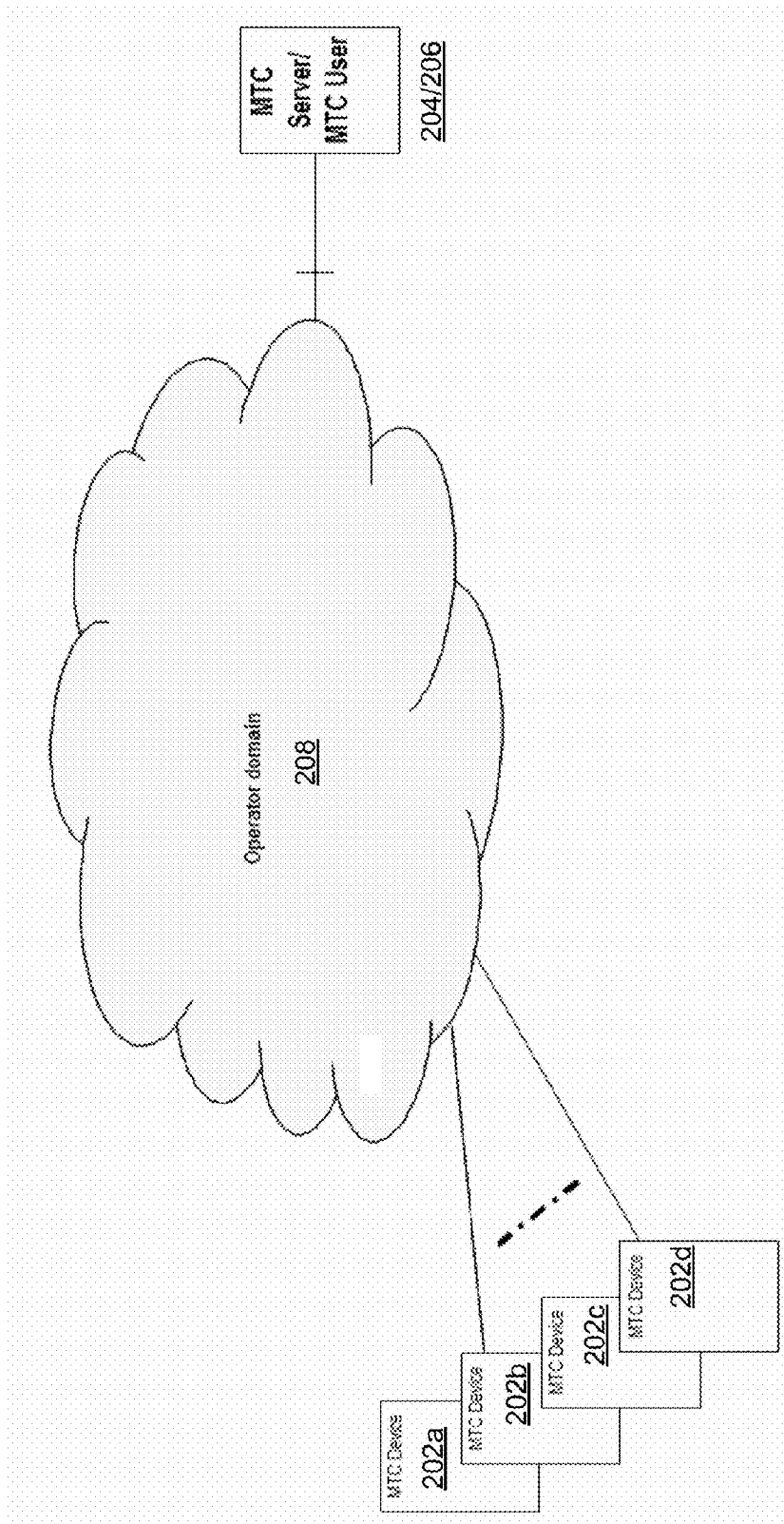
FIG. 3 shows example architecture for MTC communication that includes an MTC server located outside of an operator domain.

FIG. 3 illustrates example architecture for use in MTC communication. As shown, one or more MTC devices such as MTC devices 202a, 202b, 202c and 202d may communicate to one or more MTC servers such as MTC server 204 and/or one or more MTC users such as MTC user 206 via an operator domain such as operator domain 208. The MTC server 204 may be located in the operator domain 208, for example. MTC users such as MTC user 206 may access the MTC server 204, for example, via an application protocol interface (API) such that the MTC user may communicate with MTC devices 202a, 202b, 202c. As shown in FIG. 3, the MTC server 204 may be located outside of the operator domain 208.

Figure 4:
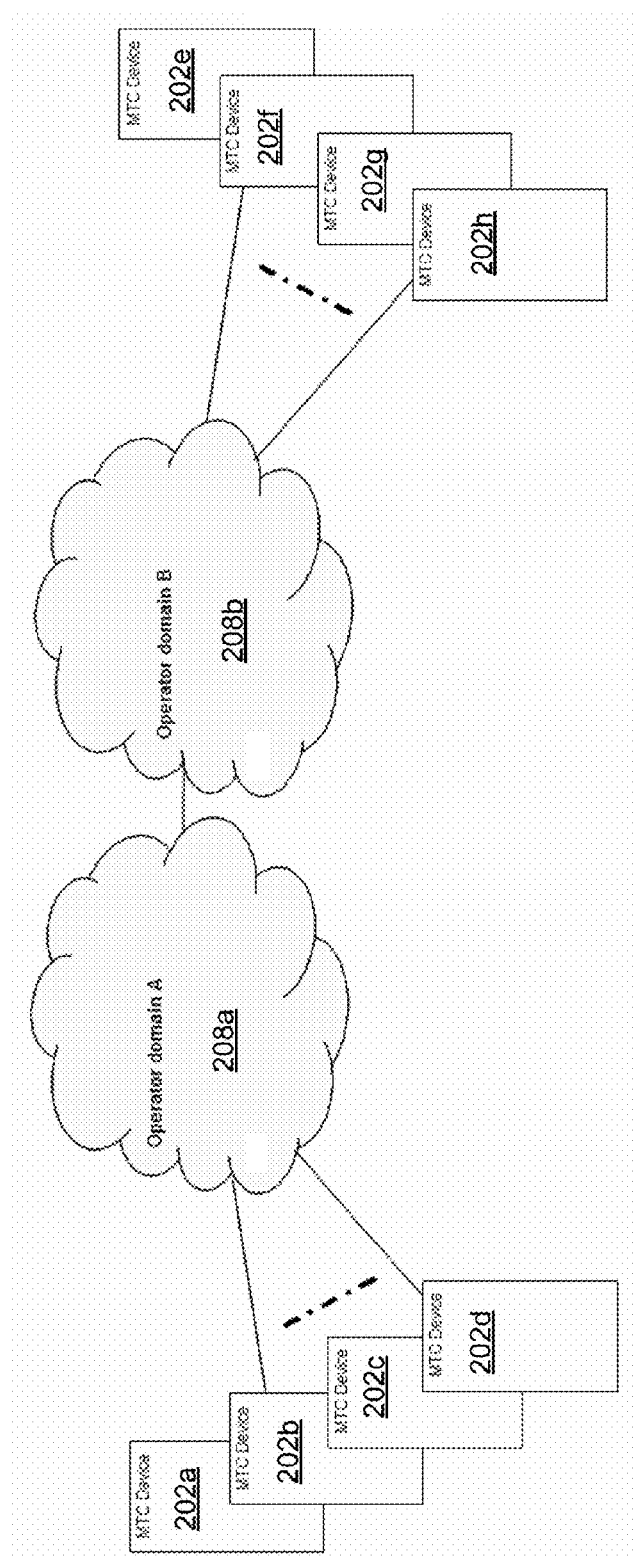
FIG. 4 shows example architecture for MTC WTRU communication wherein MTC WTRUs communicate directly without an intermediate MTC server.

FIG. 4 illustrates example architecture for use in MTC communication. As shown, MTC devices communicate with each other (MTC-MTC communication) without an intermediary MTC server. For example and as shown in FIG. 4, one or more MTC devices such as MTC devices 202a, 202b, 202c and 202d may communicate to one or more MTC devices 202d, 202e, 202f and 202g via multiple operator domains such as operator domains 208a and 208b. As shown in FIG. 4, operator domains 208a and 208b may be operatively connected to each other such that MTC devices connected to operator domain 208a may communicate to MTC devices connected to operator domain 208b, and vice versa.

MTC WTRUs may operate in groups. In an embodiment, MTC WTRUs belonging to the same cell may be grouped into an MTC group. In an embodiment, MTC WTRUs located in the same area may be grouped into an MTC group. For example, utility meters within a neighborhood may be grouped into an MTC group. In an embodiment, an MTC group may be defined based on one or more shared features among MTC WTRUs. For example, MTC WTRUs that use a common application may be classified as a group.

An MTC WTRU may use an International Mobile Subscriber Identity (IMSI) for network authorization and/or authentication. For example, if the MTC WTRUs authenticate to a network based on 3GPP technology, the International Mobile Subscriber Identity (IMSI) may be used for registration with an Access Authorization, and Authentication (AAA) server according to 3GPP standards.

In an embodiment, the MTC WTRUs belong to the same MTC group may share the same IMSI or a group-based IMSI/group IMSI. For example, the group IMSI may be associated with a specific cell/area and the registration procedure may be denied if it is coming from other cells/areas. An individual MTC WTRU may be associated with a WTRU identifier that may uniquely identify the MTC WTRU by itself or in conjunction with the corresponding group IMSI. For example, a WTRU identifier may be the account number associated with a utility meter.

In an embodiment, a WTRU identifier may be based on a combination of the corresponding group IMSI and an index or serial number of the MTC WTRUs. For example, the network may identify individual MTC WTRUs as IMSI1-1, IMSI1-2, IMSI1-3 . . . IMSI1-N. In an embodiment, individual MTC WTRUs may identified using combination of the group-based IMSI and their respective individual Uniform Resource Identifiers (URIs). In an embodiment, individual MTC WTRUs may identified using combination of the group-based Packet-Temporary Mobile Subscriber Identity (P-TMSI) and their respective individual Uniform Resource Identifiers (URIs). The URI/URL may be based on the WTRU identifier of the MTC WTRU, for example, an account number that may correspond to an MTC utility meter.

In an embodiment, an MTC group may be identified using a group identifier such as a Group ID, group IMSI, or "groupIMSI" or the like that may uniquely identify the MTC group. For example, the network may contact an MTC group via the group identifier associated with the MTC group. MTC WTRUs may be provisioned with a specific Group ID. A Group ID may be a number that may unique identifies a group of MTC WTRUs. Under each Group ID, specific information for each group may be stored. The Group ID may be broadcast in a signal information block (SIB).

Individual MTC WTRUs may be updated using paging. MTC WTRUs may be updated via broadcast messages using WTRU identifiers such as IMSI and/or P-TMSI combining with their respective account numbers. Polling by the network may be performed using control channel signaling and/or by using traffic channel in-band signaling.

If an MTC WTRU is paged and is instructed to connect to the network, the MTC WTRU may perform a system access process. The system access may include requesting a Radio Resource Control (RRC) connection. The system access may include being allocated an IP address. The MTC WTRU may use the allocated IP address to connect to a M2M Access Server (AS). The M2M AS may include an application server that may serve as a gateway for M2M users to access the CN.

Registration of an MTC WTRU may be performed on a periodic basis or once upon system power up. The network may trigger one or more specific MTC WTRUs to perform registration and IP configuration of a group of MTC WTRUs. The network may trigger such registration periodically.

MTC WTRUs may be in sleep cycles or wake-up cycles. Wake-up cycles may be divided into control cycles and reporting cycles.

In a control cycle or other cycle, when a group of MTC WTRUs wake up, the MTC WTRUs may not register again with their system respective control channel(s). The MTC WTRUs may wait for one or more updates on the control channel. During the cycle, IP addresses for the MTC WTRUs may or may not be allocated.

During a control period, the CN may send control data to the MTC WTRUs to configure how they operate. The CN may perform group pre-registration upon initiation and may activate an IP address for each group. The CN may page the individual cells using system pages. The system pages may include information and/or relate to information such as a group identifier and may select one MTC as a master to perform Access. A M2M application server may exchange information with the CN and/or a M2M user. The exchanged information may relate to, for example, time-based events, pre-registration requests, lists of cells, lists of corresponding IMSIs and/or a time window.

During a reporting period, control data may be sent using traffic channel signaling. The control data may be sent at or above the IP layer, or at other layers. A group IMSI may be associated with a specific cell and/or area. If a registration procedure is performed with the same IMSI coming for a different cell or geographic area, the registration may be denied by the network. Individual MTCs may be allocated with different local IP address within their network for the duration of reporting. MTC WTRUs belonging to an MTC group may use the same radio resources and the same IP address to transmit their data.

In a reporting cycle, the MTC WTRUs may transmit data to the network. The MTC WTRUs may transmit data in a sequential order specified by the network, or multiple WTRUs may report their data at the same time. Reporting activities that may involve an IP access may be scheduled by the network, may be scheduled randomly by MTC WTRUs, may be set according to pre-configured settings, or according to any combination of the preceding. A reporting cycle may include a M2M application server (M2M AS) exchanging information with the CN and/or a M2M user. The exchanged information may relate to, for example, time-based events, on-time pre-registration requests, list of cells, a list of corresponding IMSIs, and time windows.

Figure 5:
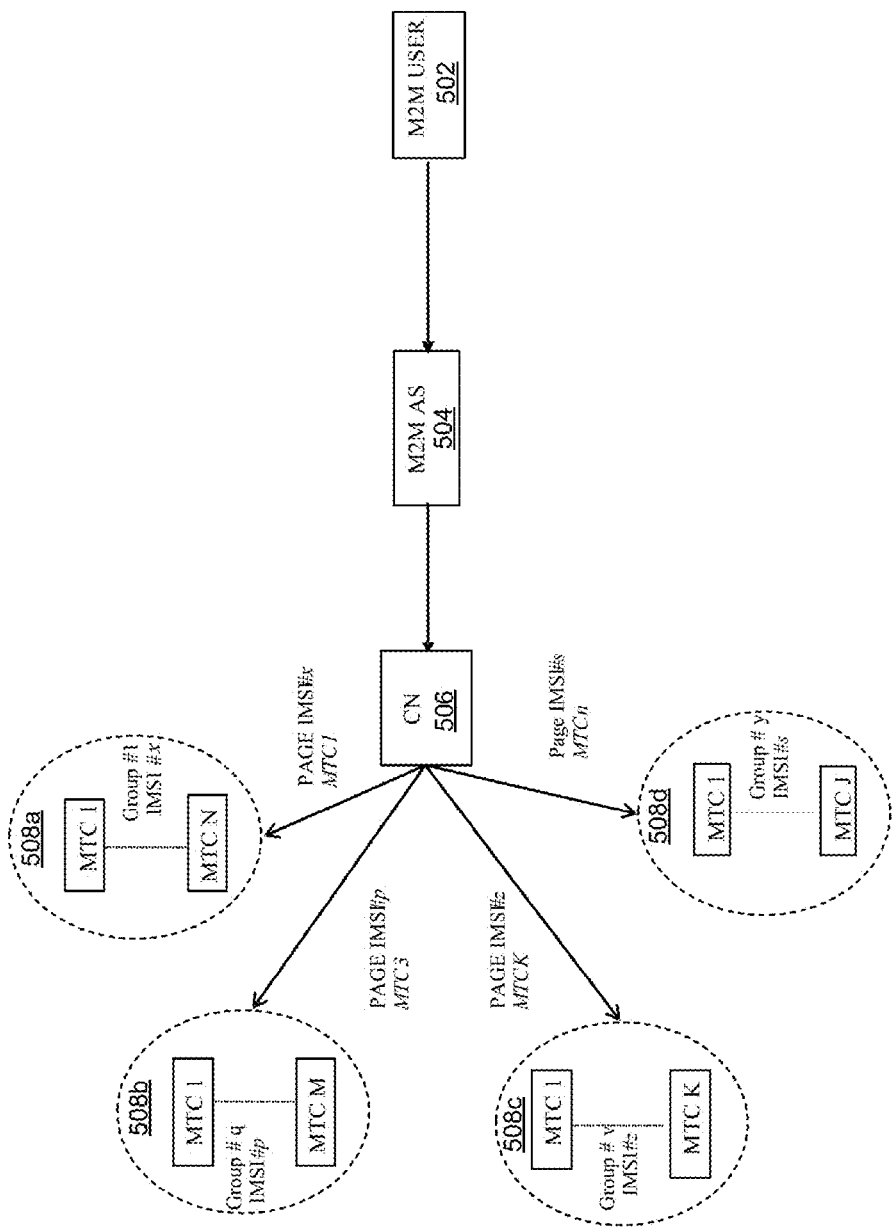
FIG. 5 shows an example MTC group-based pre-registration.

FIG. 5 shows an example pre-registration for a group of MTC WTRUs. As shown, a M2M user, such as M2M user 502 may initiate a communication session with MTC groups 508a-508d via one or more M2M AS such as M2M AS 504 and a CN such as CN 506. For example, the CN 506 may include a CN, such as the one described in connection with FIGS. 1C-E, capable of facilitating MTC/M2M technology. The CN include a transceiver such as the transceiver described in connection with FIG. 1B, and a processor such as one described in connection with FIG. 1B. The transceiver may be configured to receive an indication from an MTC access server to facilitate communication between the MTC access server and an MTC group. The processor may be configured to allocate an IP address and radio resources for the MTC group upon receiving the indication from the MTC access server and transmit information associated with the allocated IP address and radio resources to the MTC WTRUs in the MTC group. For example, the CN 506 may perform group pre-registration for MTC groups 508a-508d upon a request for network registration. The pre-registration request may be triggered periodically, or may be triggered based on an event.

The M2M user 502 may include a system that may interact with MTC WTRUs. For example, the M2M user 502 may include a plurality of computing devices that may pull data from one or more MTC WTRUs. In an embodiment, the M2M AS 504 may act as a gateway between the M2M user 502 and the CN 506. As shown, each of the MTC groups 508a-508d may include one or more MTC WTRUs. In an embodiment, the MTC WTRUs that belong to an MTC group may use the same IMSI, and may use the same IP address for data transmission. For example, as shown, MTC WTRUs MTC1 . . . MTC N of MTC group 508(a) may share IMSI #x.

Figure 6:
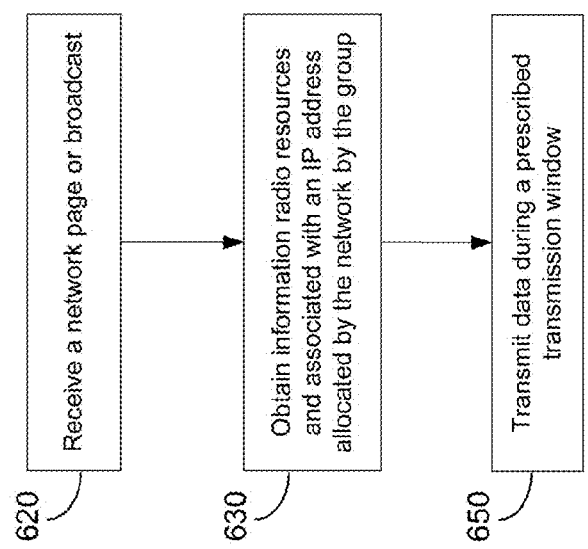
FIG. 6 shows an example process for group-based M2M communication.

FIG. 6 shows an example pre-registration process. At 620, an MTC WTRU may receive a network page or broadcast. For example, the MTC WTRU may include a transceiver such as the transceiver 120 described in connection with FIG. 1B, capable of receiving and transmitting data/signal using MTC/M2M technology. The transceiver may be configure to receive the network page or broadcast. The MTC WTRU may listen for network paging or broadcast upon waking up from a sleep cycle.

Figure 7:
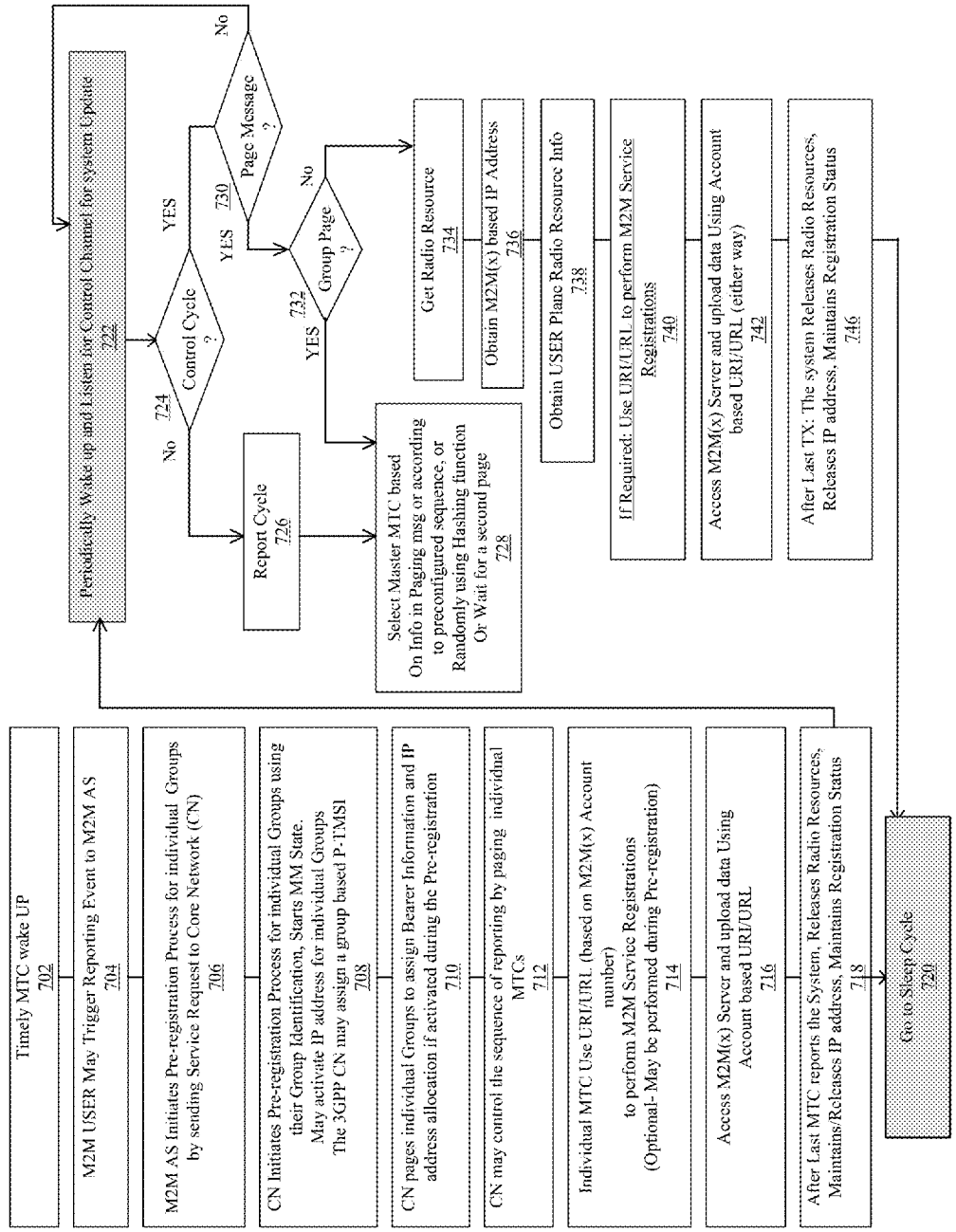
FIG. 7 shows an example process for group-based M2M communication.

For example, turning to FIG. 7 that shows an example pre-registration process, at 702, an MTC WTRU may wake up from a sleep cycle. At 704, an M2M user such as the M2M user 502 shown in FIG. 5, may trigger a reporting event to the M2M AS. For example, the M2M user 502 may send a trigger to the M2M AS 504. For example, the M2M user 502 may initiate a reporting event to the M2M AS 504 as a trigger for registration process. The trigger may be transmitted via a TCP/IP connection between the M2M user 502 and the M2M AS 504.

At 706, the M2M AS may initiate the pre-registration process for one or more MTC WTRU groups. For example, upon receiving the trigger from the M2M user 502, the M2M AS 504 may initiate the pre-registration process for one or more MTC WTRU groups. The M2M AS 504 may send a service request to the CN 506. The service request may indicate one or more MTC groups that the M2M user wishes to communicate with. For example, the service request may include an indication of one or more group identifiers, cell identifiers, area identifiers, IMSIs or the like such that the request may identify the MTC group(s) that need to be addressed. In an embodiment, the service request may include a time window for data transmission between the M2M user 502 and the MTC group(s) 508a-508d.

At 708, the CN may perform the pre-registration process for each MTC group using their respective group identification. For example, upon receiving the service request from the M2M AS 504, the CN 506 may prepare the MTC WTRUs in the target MTC groups for network registration using their respective group IDs. A Mobility Management (MM) state may be started. The CN 506 may allocate and/or configure IP addresses for individual MTC groups. For example, an IP address may be activated for each MTC group indicated in the service request from the M2M AS. For example, the CN 506 may assign a group-based P-TMSI, and/or radio bearer to each MTC group.

As described above, the CN may allocate an IP address for an MTC group upon a service request from the M2M AS.

Thus, the CN may perform IP address allocation without first receiving a registration request from the MTC group or an MTC WTRU within the MTC group. This may reduce network traffic caused by individual MTC WTRUs requesting IP addresses simultaneously.

At 710, the CN may page individual MTC WTRU groups to send IP address allocation information, RRC information such as radio bearer information, and/or P-TMSI information. In an embodiment, the CN may only page MTC WTRU groups that are activated during pre-registration. The CN 506 may page individual MTC groups 508a-508d with a group identifier associated with the MTC group. For example, the CN 506 may page or broadcast to MTC groups 508a-508d using their respective IMSIs.

Turning back to FIG. 6, at 630 the MTC WTRU may obtain radio resources and IP address information. For example, the MTC WTRU may include a processor such as the processor 118 described in connection with FIG. 1B, capable of processing information using MTC/M2M technology. The processor may be configured to obtain the radio resources and IP address information. The MTC groups 508a-508d may be paged by the CN 506. For example, the CN 506 may page MTC WTRU groups to send IP address allocation information, RRC information such as radio bearer information, and/or P-TMSI.

In an embodiment, the MTC WTRU may receive a broadcast or a page that may contain Radio Resources, the assigned IP address information and/or P-TMSI from the CN. In an embodiment, the MTC WTRU may receive an indication to retrieve radio resources and/or IP address information via a dedicated channel. For example, the radio resources and/or the IP address have been allocated/assigned to the MTC group prior to the MTC WTRU contacting the CN to retrieve such information.

At 650, the MTC WTRU may transmit data during a prescribed transmission window. The MTC WTRUs within a paged MTC group may transmit data using the received IP address, RRC resources and/or the P-TMSI. For example, the transceiver of the MTC WTRU may be configure to transmit data during a prescribed transmission window.

For example, the MTC WTRUs may transmit data one at a time. In an embodiment, a prescribed transmission window associated with the MTC WTRU for transmitting data may be determined. For example, the processor of the MTC WTRU may be configured to determine the prescribed transmission window. For example, turning back to FIG. 7, at 712, the CN may control the sequence of reporting by paging individual MTC WTRUs within an MTC WTRU group. The CN may page individual MTC WTRUs based on a respective WTRU identifier for the particular MTC WTRU. The MTC WTRU may wait for its prescribed transmission window based on the sequence of reporting. In an embodiment, the MTC WTRUs may upload data on Common Traffic Channel (CTCH) and/or random access channel (RACH).

At 714, the MTC WTRU may use URI/URL to perform M2M service registrations. At 716, the MTC WTRUs may access an application server such as the MTC AS 504 and may upload data using the URI/URL. For example, upon receiving a page from the CN indicating that it is the MTC WTRU's turn to transmit data, the MTC WTRU may transmit data during its assigned transmission window.

As shown in FIG. 7, at 718, after the last MTC WTRU in the MTC WTRU group finishes reporting, the CN may release radio resources for the MTC WTRU group. For example, at the end of a reporting period, the last MTC WTRU that may perform reporting may release radio resources. The last WTRU may conclude the MTC session for the group with the M2M server, and may or may not release an IP address associated with the group. In an embodiment, the CN may maintain the assigned IP address for the MTC WTRU group. In an embodiment, the CN may release the assigned IP address for the MTC WTRU group. In an embodiment, the CN may maintain the registration status for the MTC WTRU group. In an embodiment, the CN may release the registration status for the MTC WTRU group. For example, if the registration process is triggered by a periodic event, the registration status for the MTC WTRU group may not be maintained after the periodic event/operation completes.

At 720, the MTC WTRUs may go to a sleep cycle. At 722, an MTC WTRU may wake up and listen for the control channel. In an embodiment, the MTC WTRUs may wake up periodically based on a predetermined time interval. For example, utility meters may wake up on a weekly and/or monthly basis to report utility consumption to a utility provider. At 724, the MTC WTRU may determine whether a control channel exists. If the control channel exists, the MTC WTRU may determine whether the MTC WTRU is in a control cycle.

Based on a determination that the MTC WTRU is in a control cycle, at 730, the MTC WTRU may determine whether it has received a paging message. If the MTC WTRU has not received a paging message, the MTC WTRU may continue to listen for a system update as illustrated in 722. If the MTC WTRU has received a paging message, at 732 the MTC WTRU may determine whether the paging message is a group paging message. If the paging message is not a group paging message, at 734, the MTC WTRU may perform one or more actions to obtain a radio resource. For example, the MTC WTRU may not rely on the master MTC in the MTC group to initiate the configuration process. For example, if the IP address is released at 718, at 736, the MTC WTRU may obtain a WTRU-based IP address by sending a request to the CN for an IP address and/or radio resource.

In an embodiment, if the paging message is a group paging message, at 728, the MTC WTRU may identify the master MTC in the MTC group. The master MTC may selected by the CN and/or by an MTC via a pre-configuration process, may be selected by the CN on an as-needed or just-in-time basis, may be selected based on information in the paging message, may be based on a random selection, and/or may be selected using a hash function. In an embodiment, the MTC WTRU may wait for a second paging message.

Based on a determination that the MTC WTRU is not in a control cycle, at 726, the WTRU may determine that the MTC WTRU is in a reporting cycle. In response to the determination that the MTC WTRU is in a reporting cycle, at 728, the MTC WTRU may identify the master MTC WTRU in the MTC group, or wait for a second paging message.

At 734, the MTC WTRU may perform one or more actions to obtain radio resources. If the MTC WTRU is a master MTC WTRU, the MTC WTRU may obtain radio resources on behalf of an MTC group with which it is associated. If the MTC WTRU is not a master MTC WTRU, the MTC WTRU may obtain radio resources from the master MTC WTRU of the MTC group.

At 738, the MTC WTRU may obtain user plane radio resource information. The MTC WTRU may perform M2M service registration. At 740, the M2M service registration may be performed using one or more URLs or URIs. The URLs and/or URIs may be based on, for example, information related to an account associated with the MTC WTRU. At 742, the MTC WTRU may access an application server and upload data. Uploading the data to the server may be performed using the URL and/or URI. At 746, after the last transmission completes, the CN may release radio resources. The MTC WTRU and/or the network may maintain an IP address and/or may maintain registration status of the MTC WTRU and/or the MTC group. At 720, The MTC WTRU may return to a sleep cycle.

In an embodiment, an MTC WTRU may be selected by the network to perform IMSI attachment on behalf of the group. The selected MTC WTRU may be referred to as a "master MTC WTRU." The master MTC may perform IMSI attachment on behalf of the group. The master MTC WTRU may additionally obtain information and/or resources on behalf of the group, such as RRC resources, a P-TMSI, an IP address, or other resources or data.

If a master MTC is selected but fails to perform the activities associated with the master MTC WTRU role, another MTC WTRU may be selected as the master MTC for the group and perform the master MTC WTRU actions. Detection of master MTC failure may be performed by the network, the master MTC itself, and/or other MTC WTRUs in or outside of the group.

As described above, an MTC group may be identified using a group identifier such as "Group ID". Each MTC WTRU may have knowledge of its corresponding Group ID, The MTC WTRUs in the MTC group may listen on a broadcast channel upon waking up from a sleep cycle. When an MTC WTRU receives a broadcast message that may include an IMSI, the MTC WTRU may determine whether the IMSI matches the group IMSI associated with the MTC group. If it is determined that the IMSI matches the group IMSI associated with the MTC group, the MTC WTRU may further process the received broadcast message. If it is determined that the IMSI matches the group IMSI associated with the MTC group, the MTC WTRU may discard the received broadcast message. For example, MTC WTRUs may look for the Group ID in a received system information block (SIB). If the MTC WTRUs do not see a matching Group ID, the MTC WTRUs may not start any activity in response to the received SIB. The SIB may include information such as, but not limited to, a group ID, information regarding a sleep cycle, a control cycle, and/or a reporting cycle.

A SIB may include an attachment acceptance flag such as a flag called "ATTACH_ACCEPT," which may be broadcast when a master MTC successfully registers with the CN. The master MTC WTRU may re-register if this flag is not set after its sleep cycle. The other MTC WTRU in the group, also referred to as "slave MTC WTRUs," may initiate actions if the flag is set.

When an MTC WTRU successfully attaches to the network, a serving General packet radio service (GPRS) that may support node (SGSN) may allocate a packet data protocol (PDP) context. For a mobility management entity (MME), the Internet Protocol (IP) address may be available with the ATTACH_REQUEST message. A complete or partial PDP context may be pushed to the MTC devices.

In an embodiment, a resource block (RB) may be pre-assigned/pre-reserved (RBn) in the radio network controller (RNC) for MTC communication. The RB may be generated and conveyed to the MTC for each MTC communication. If a RB is generated, the RB may be conveyed to the MTC WTRUs.

A "Paging Type 1" message may be used to indicate the MTC devices. There may be a modified information element (IE) in the message. The modified IE in the message may include a WTRU ID that may be modified to include an account number, a RB ID, and/or a PDP context. The modified IE in the message may also include a page cause set to indicate a M2M data upload.

An example of the signaling and data transfer used in a method for performing network initiated and controlled data collection from M2M Hubs/Gateway is described in greater detail hereafter.

FIG. 8A illustrates a flow diagram of performing M2M communications for a master MTC. For example, the master MTC WTRU, may include a WTRU, such as the one described in connection with FIGS. 1A-E, capable of communicating using MTC/M2M technology. For example, the master MTC may include a transceiver and a processor as described in connection with FIG. B. The transceiver may be configured to receive indication to initiate registration request as a master MTC, and transmit data during its prescribed transmission window. The processor may be configured to perform network registration process on behalf of the MTC group and obtain radio resources and IP address information.

As shown in FIG. 8, at 810, an indication to initiate registration request as a master MTC may be received. At 820, the master MTC may perform network registration process on behalf of the MTC group. For example, the master MTC may send a network attach request with information that may identify the MTC WTRUs in the MTC group such that the network may send attachment acceptance message to the MTC WTRUs in the MTC group. The a network attach request may include a group IMSI associated with the MTC group and/or WTRU identifiers for all or a portion of the MTC WTRUs in the MTC group in the network attachment request.

At 830, the master MTC may obtain radio resources and IP address information. For example, the MTC WTRUs may receive a broadcast or a page that may contain Radio Resources, the assigned IP address information and/or P-TMSI from the CN. In an embodiment, the MTC WTRUs may receive an indication to retrieve radio resources and/or IP address information via a dedicated channel, the MTC WTRUs may retrieve such information based on the indication.

At 840, the master MTC may transmit data during its prescribed transmission window. For example, the master MTC may wait for its transmission window. The transmission window may be indicated by the network. For example, the master MTC may transmit data upon receipt of a page. The transmission windows for individual MTC WTRUs may be preconfigured, may be randomly selected, and/or maybe determined based on a hash function. During the master MTC's transmission window, the MTC may transmit data to a M2M user via a dedicated channel using the obtained IP address and radio resources.

Upon completion of transmission, the master MTC may wait for the network for an indication to release radio resources, IP address, and/or registration status. When the network pulls the master MTC, the master MTC may look for such an indication, and may release radio resources, IP address, and/or registration status in accordance with the indication received.

FIG. 8B illustrates a flow diagram of performing M2M communications for a slave MTC. For example, the slave MTC WTRU, may include a WTRU, such as the one described in connection with FIGS. 1A-E, capable of communicating using MTC/M2M technology. For example, the slave MTC may include a transceiver and a processor as described in connection with FIG. B. The transceiver may be configured to listen for paging or broadcast, and transmit data during its prescribed transmission window. The processor may be configured to obtain radio resources and IP address information.

As shown in FIG. 8, at 860, a slave MTC may listen for paging or broadcast. For example, the slave MTC may wake up from a sleep cycle, and may listen on broadcast channel(s). For example, the slave MTC may receive a SIB such as SIBn via broadcast. The slave MTC may check for its Group ID in SIBn. If the Group ID matches, the slave MTC may determined whether "sleep cycle", "report cycle" or "control cycle" is in progress. The slave MTC may start a timer and may listen for an indication that the MTC group has been attached to the network.

For example, the slave MTC may receive a SIB such as SIBn via broadcast. The slave MTC may check for its Group ID in SIBn. If the Group ID matches, the slave MTC may check whether the "ATTACH ACCEPT" flag is set. As described above, "ATTACH ACCEPT" flag may indicate that the master MTC has completed network attachment process on behave of the MTC group, and an IP address and radio resources have been allocated for the group.

At 870, the slave MTC may obtain radio resources and IP address information. For example, the slave MTC WTRU may receive a broadcast or a page that may contain Radio Resources, the assigned IP address information and/or P-TMSI from the CN. In an embodiment, the slave MTC may receive an indication to retrieve radio resources and/or IP address information via a dedicated channel. In an embodiment, the slave MTC may receive an indication to retrieve radio resources and/or IP address information via a dedicated channel, the slave MTC WTRU may retrieve such information based on the indication.

At 880, the slave MTC may transmit data during its prescribed transmission window. For example, the slave MTC may wait for its transmission window. For example, the slave MTC may transmit data upon receipt of a page. During the slave MTC's transmission window, the slave MTC may transmit data to a M2M user via a dedicated channel using the obtained IP address and radio resources.

Figure 9A:
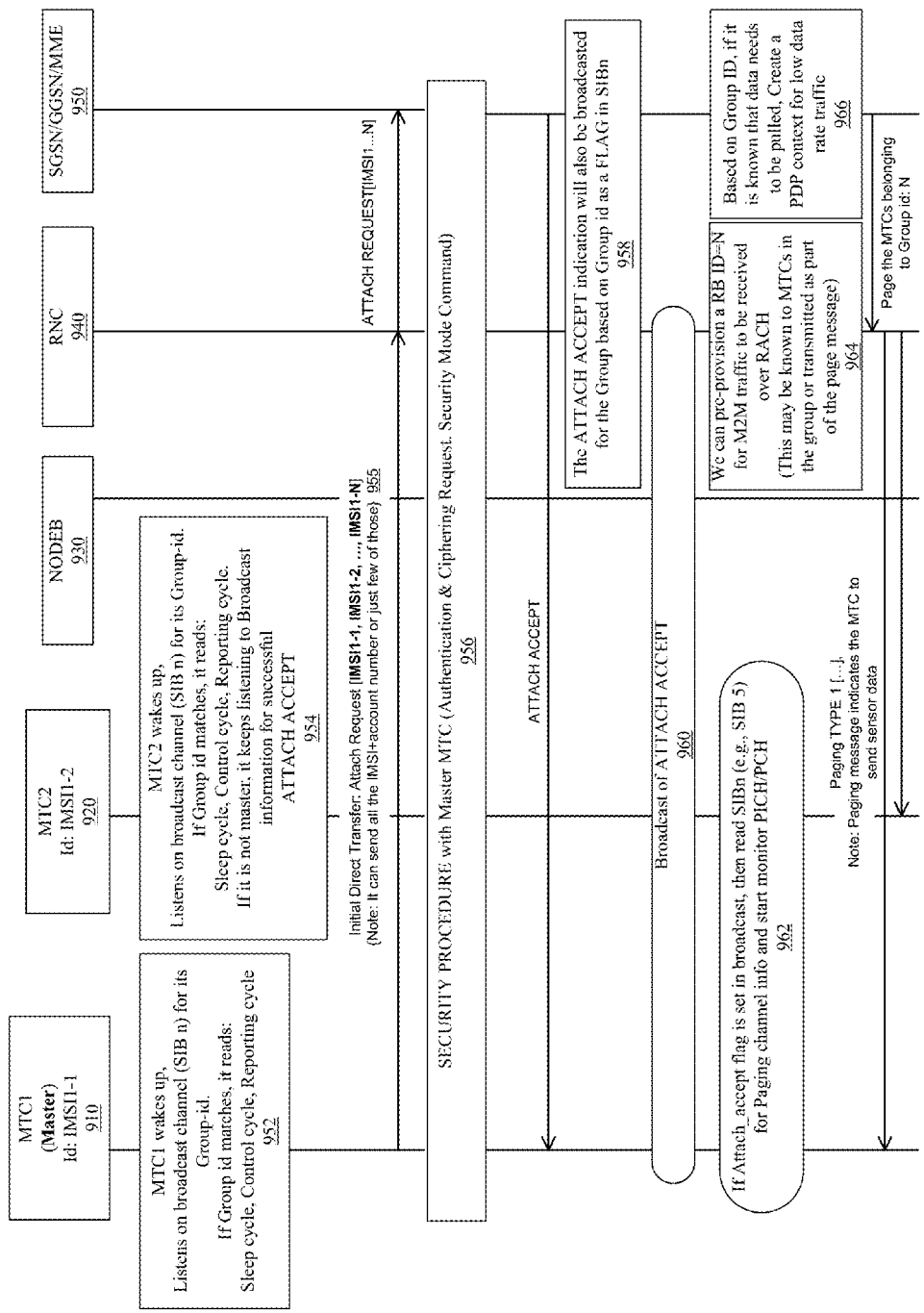
FIGS. 9A and 9B illustrate a flow diagram of a method for performing M2M communications.
Figure 9B:
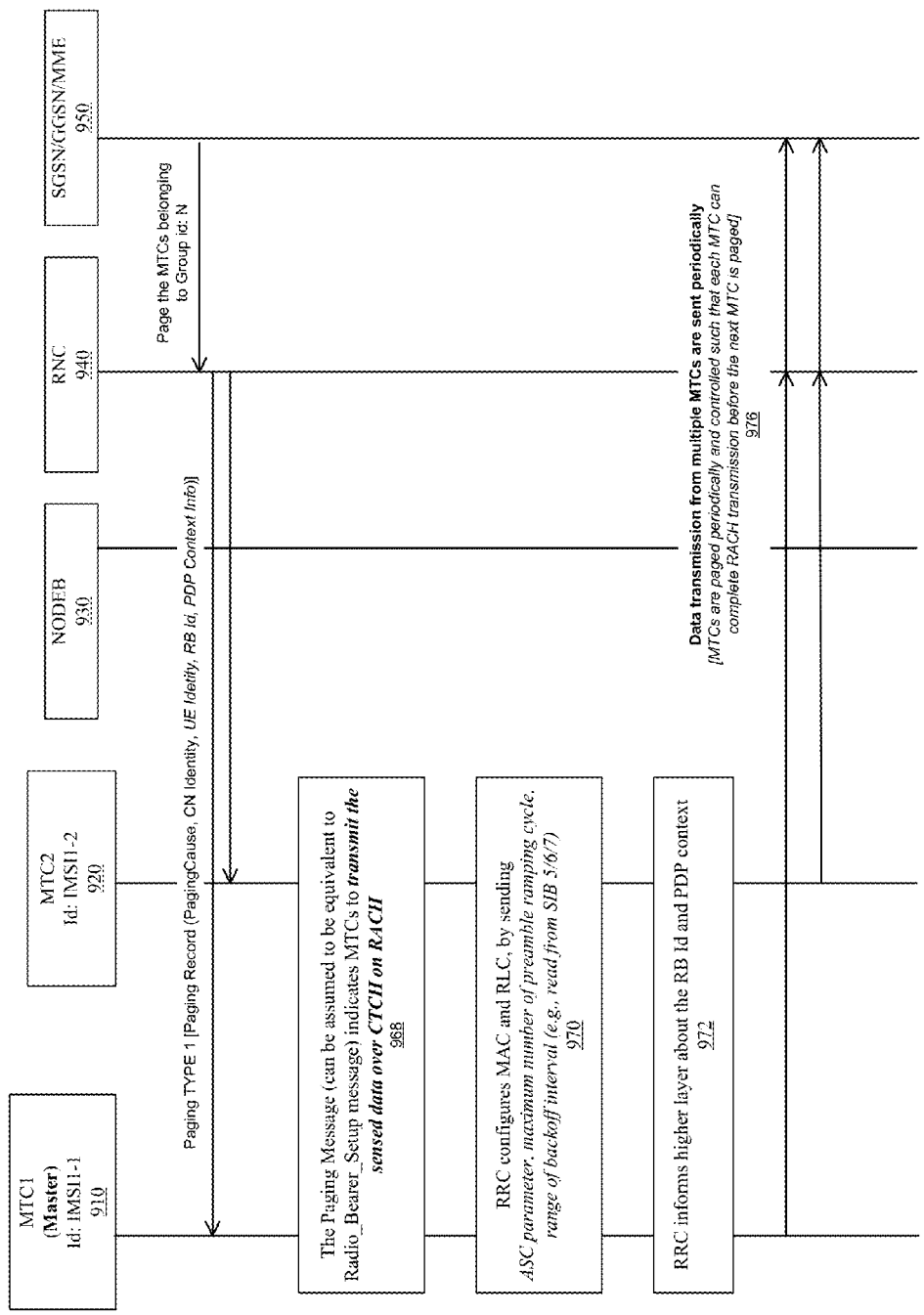

FIGS. 9A and 9B illustrate a flow diagram of a method for performing M2M communications. As shown in FIG. 9A, at 952, a master MTC such as the Master MTC1 910 may wake up and may listen on broadcast channel. The master MTC may receive a broadcast of a page to initiate registration request. For example, the master MTC may receive a SIB such as SIBn via broadcast. The master MTC may check for its Group ID in SIBn. If the Group ID matches, the master MTC may determine whether a "sleep cycle", "report cycle" or "control cycle" is in progress.

At 954, the slave MTCs such as MTC 2 920 may wake up and may listen on broadcast channel. For example, the slave MTC may receive a SIB such as SIBn via broadcast. The slave MTC may check for its Group ID in SIBn. If the Group ID matches, the master MTC reads "sleep cycle", "report cycle" and "control cycle." The slave MTC may start a timer and may listen for an indication that the MTC group has been attached to the network. For example, the slave MTC may check whether the "ATTACH ACCEPT" flag is set in a SIB directed to the same Group ID.

For example, as shown in FIG. 9A, the master MTC may check for an "ATTACH ACCEPT" flag. If the flag is not set, at 955, the master MTC may perform IP address configuration on behalf of the MTC group. For example, the master MTC may send a network attachment request or IMSI attach request such as an "IMSI ATTACH" message to the network. In the IMSI ATTACH message, the master MTC may send the IMSI associated with the MTC group and/or WTRU identifiers such as account numbers for all or a portion of the MTC WTRUs in the MTC group. At 956, security procedure such as authentication, ciphering request, and/or security mode command may be carried out.

After the MTC group successful attaches to the network, at 958, an SGSN/GGSN/MME such as SGSN 950 may broadcast an attachment acceptance indication to the MTC WTRUs. For example, the attachment acceptance indication may be broadcasted for the MTC WTRU group based on the corresponding Group ID as a flag in SIBn. The flag may be referred to as the "ATTACH ACCEPT" flag. At 960, "ATTACH ACCEPT" flag may be continuously broadcasted as long as the registration is valid.

In an embodiment, a successful attachment procedure from the MTC group may trigger PDP context activation. For example, at 966, the SGSN 950 may determine that data may need to be pulled from the MTC group based on the Group ID. In an embodiment, a PDP context may be created for low data rate transmission. The SGSN 950 may trigger an RNC such as RNC 940 to send the PDP context to the MTC group. The SGSN 950 may page a group of MTC WTRUs at a time.

At 964, the RNC 940 may send a RB ID for M2M communication over RACH. The RNC 940 may be configured to send PDP context information to the MTC WRTUs using the Paging Type 1 message. The RB ID may be known to the MTC WRTUs in the group, or may be transmitted as part of the paging message.

At 962, the MTC WRTUs including the master MTC and slave MTC(s) may be configured to read an SIB, i.e. SIB 5, to obtain paging channel information. The MTCs may monitor paging channel such as Paging Indicator Channel (PICH) and/or Paging Channel (PCH).

Continuing onto FIG. 9B, at 968, the MTC WRTUs may receive the "Paging Type 1" message from the RNC 940. The "Paging Type 1" message may include paging cause, CN identity, UE identity, RB ID, and/or PDP context information. For example, the received "Paging Type 1" message may include a page cause set to M2M data upload In an embodiment the paging message may indicate the MTCs to transmit sensed data over a Common Traffic Channel (CTCH)/random access channel (RACH).

Receipt of "Paging Type Message" with page cause set to M2M data upload may trigger the configuring of medium access control (MAC)/radio link control (RLC) by radio resource control (RRC) for RACH communication. The MTC may use the RB ID and PDP context to send data to coordination nodes over a CTCH/RACH. The paging occasion and RACH transmission may be controlled by the CN for each group in such a way that RACH collision is minimized. For example, after MTC1 is paged, MTC2 may be paged after MTC1 has a sufficient window to perform the RACH transmission.

At 970, the RRC 940 may configure MAC and RLC by sending ASC parameter, maximum number of preamble ramping cycle, range of backoff interval. For example, the MTCs may obtain configuration information via SIB5/6/7. At 972, the RRC may inform higher layer about the RB ID and PDP context.

At 976, data transmission from multiple MTCs may be sent periodically. For example, the MTCs may be paged periodically and controlled such that each MTC may complete RACH transmission before the next MTC is paged.

Though the example embodiments described herein are carried out in the context of IP address, it is to be understood that the technique applies to other network addresses. While the various embodiments have been described in connection with the various figures, it is to be understood that other similar embodiments may be used or modifications and additions may be made to the described embodiment for performing the same function of the various embodiments without deviating there from. Therefore, the embodiments should not be limited to any single embodiment, but rather should be construed in breadth and scope in accordance with the appended claims.

What is claimed:

1. A method for performing group-based machine-to-machine communication, the method comprising:
  waking up from a sleep cycle;
  listening for at least one of paging or broadcast from a communication network;
  receiving an indication from the communication network via the at least one of paging or broadcast, the indication comprising information associated with an IP address, wherein the IP address is allocated for a machine type communication (MTC) group comprising a plurality of MTC wireless transmit/receive units (WTRUs), wherein the IP address is allocated prior to a MTC WTRU network registration process associated with the MTC group;
  obtaining the IP address based on the received indication;
  sending data using the obtained IP address in a prescribed transmission window; and
  returning to the sleep cycle upon the MTC WTRUs completing data transmission.

2. The method of claim 1, wherein allocation of the IP address is triggered by a service request from an MTC access server.

3. The method of claim 1, wherein the indication from the communication network further comprises information associated with radio resources allocated for the MTC group, and the method further comprising obtaining the radio resources based on the received indication.

4. The method of claim 1, wherein the allocated IP address is released upon the MTC WTRUs completing data transmission.

5. The method of claim 1, wherein the allocated IP address is maintained upon the MTC WTRUs completing data transmission.

6. The method of claim 1, further comprising performing network registration on behalf of the MTC group.

7. The method of claim 1, further comprising sending a network registration request on behalf of the MTC group, and wherein the indication from the communication network is received in response to the network registration request.

8. The method of claim 7, wherein the network registration request comprises a group International Mobile Subscriber Identity (IMSI) associated with the MTC group.

9. The method of claim 7, wherein the network registration request comprises a group IMSI associated with the MTC group and at least one MTC WTRU identifier.

10. The method of claim 1, further comprising:
  listening on a broadcast channel upon waking up from the sleep cycle;
  receiving a broadcast message comprising an IMSI;
  determining whether the IMSI matches a group IMSI associated with the MTC group; and
  based on a determination that the IMSI matches the group IMSI associated with the MTC group, processing the received broadcast message.

11. The method of claim 1, further comprising:
  listening on a broadcast channel for an indication that the MTC group has been attached to the network upon waking up from the sleep cycle; and
  upon receiving the indication that the MTC group has been attached to the network, monitoring a paging channel for an indication of the prescribed transmission window associated with the WTRU.

12. The method of claim 1, further comprising:
receiving a paging message;
determining whether the WTRU is in a control cycle;
based on a determination that the WTRU is in the control cycle, determining whether the received paging message is directed to the MTC group; and
based on a determination that the received paging message is directed to the MTC group, waiting for a master MTC WTRU of the MTC group to perform network registration on behalf of the MTC group.

13. The method of claim 1, further comprising:
receiving a paging message;
determining whether the WTRU is in a control cycle;
based on a determination that the WTRU is in the control cycle, determining whether the received paging message is directed to the MTC group or to the WTRU; and
based on a determination that the received paging message is directed to the WTRU, requesting an IP address dedicated to the WTRU and radio resources.

14. The method of claim 1, wherein the IP address is allocated by the communication network upon a service request from an MTC access server for facilitating a machine-to-machine communication with the MTC group.

15. The method of claim 1, wherein the prescribed transmission window is determined based on a page from the communication network.

16. The method of claim 1, wherein the method is performed at at least one of the plurality of the MTC WTRUs, and the method further comprising initiating a release of the allocated IP address upon completing data transmission if the at least one of the plurality of the MTC WTRUs is the last WTRU in the MTC group to transmit data.

17. A wireless transmit and receive unit (WTRU) configured to perform group-based machine-to-machine communication, the WTRU comprising:
a processor configured to:
wake up from a sleep cycle;
listen for at least one of paging or broadcast from a communication network;
receive an indication from the communication network via the at least one of paging or broadcast, the indication comprising information associated with an IP address, wherein the IP address is allocated for a machine type communication (MTC) group prior to a MTC WTRU network registration process associated with the MTC group, the MTC group comprising a plurality of MTC WTRUs;
obtain the IP address based on the received indication;
determine a prescribed transmission window associated with the WTRU for transmitting data;
send data using the allocated IP address in the prescribed transmission window; and
return to the sleep cycle upon the MTC WTRUs completing data transmission.

18. The WTRU of claim 17, wherein the WTRU acts as a master MTC WTRU of the MTC group, and the processor is further configured to:
perform network registration on behalf of the MTC group.

19. The WTRU of claim 17, wherein the WTRU acts as a master MTC WTRU of the MTC group, and the processor is further configured to:
send a network registration request on behalf of the MTC group, and wherein the indication from the communication network is received in response to the network registration request.

20. The WTRU of claim 19, wherein the network registration request comprises a group International Mobile Subscriber Identity (IMSI) associated with the MTC group.

21. The WTRU of claim 19, wherein the network registration request comprises a group IMSI associated with the MTC group, and at least one MTC WTRU identifier.

22. The WTRU of claim 17, wherein the processor is further configured to:
listen on a broadcast channel upon waking up from the sleep cycle;
receive a broadcast message comprising an IMSI;
determine whether the IMSI matches a group IMSI associated with the MTC group; and
based on a determination that the IMSI matches the group IMSI associated with the MTC group, process the received broadcast message.

23. The WTRU of claim 17, wherein the WTRU acts as a slave MTC WTRU of the MTC group, and the processor is further configured to:
listen on a broadcast channel for an indication that the MTC group has been attached to the network upon waking up from the sleep cycle; and
upon receiving the indication that the MTC group has been attached to the network, monitor a paging channel for an indication of the prescribed transmission window associated with the WTRU.

24. The WTRU of claim 17, wherein the WTRU acts as a slave MTC WTRU of the MTC group, and wherein the processor is further configured to
receive a paging message;
determine whether the WTRU is in a control cycle;
based on a determination that the WTRU is in the control cycle, determine whether the received paging message is directed to the MTC group; and
based on a determination that the received paging message is directed to the MTC group, wait for a master MTC WTRU of the MTC group to perform network registration on behalf of the MTC group.

25. The WTRU of claim 17, wherein the processor is further configured to
receive a paging message;
determine whether the WTRU is in a control cycle;
based on a determination that the WTRU is in the control cycle, determine whether the received paging message is directed to the MTC group or to the WTRU; and
based on a determination that the received paging message is directed to the WTRU, request an IP address dedicated to the WTRU and radio resources.

26. The WTRU of claim 17, wherein the IP address is allocated by the communication network upon a service request from an MTC access server for facilitating a machine-to-machine communication with the MTC group.

27. The WTRU of claim 17, wherein the prescribed transmission window associated with the WTRU is determined based on a page from the communication network.

28. The WTRU of claim 17, wherein the processor is further configured to:
initiate a release of the allocated IP address upon completing data transmission if the WTRU is the last WTRU in the MTC group to transmit data.

29. The WTRU of claim 17, wherein allocation of the IP address is triggered by a service request from an MTC access server.

30. The WTRU of claim 17, wherein the indication from the communication network further comprises information associated with radio resources allocated for the MTC group, and the method further comprising obtaining the radio resources based on the received indication.

31. The WTRU of claim 17, wherein the allocated IP address is released upon the MTC WTRUs completing data transmission.

32. The WTRU of claim 17, wherein the allocated IP address is maintained upon the MTC WTRUs completing data transmission.

* * * * *